(12) United States Patent
Yusa et al.

(10) Patent No.: US 11,945,140 B2
(45) Date of Patent: *Apr. 2, 2024

(54) METHOD FOR MANUFACTURING FOAM MOLDED BODY AND FOAM MOLDED BODY

(71) Applicant: MAXELL, LTD., Kyoto (JP)

(72) Inventors: Atsushi Yusa, Nagaokakyo (JP); Hideto Goto, Muko (JP); Satoshi Yamamoto, Suita (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,266

(22) Filed: Feb. 16, 2023

(65) Prior Publication Data

US 2023/0202080 A1 Jun. 29, 2023

Related U.S. Application Data

(63) Continuation of application No. 17/591,917, filed on Feb. 3, 2022, now Pat. No. 11,648,713, which is a
(Continued)

(30) Foreign Application Priority Data

Jun. 26, 2017 (JP) ................................ 2017-124317

(51) Int. Cl.
*B29C 44/10* (2006.01)
*B29C 44/04* (2006.01)
(Continued)

(52) U.S. Cl.
CPC ........ *B29C 44/105* (2013.01); *B29C 44/0415* (2013.01); *B29C 44/3415* (2013.01); *B29C 44/3442* (2013.01); *B29K 2081/04* (2013.01)

(58) Field of Classification Search
CPC .............. B29C 44/105; B29C 44/0415; B29C 44/3442

See application file for complete search history.

(56) References Cited

U.S. PATENT DOCUMENTS 5,997,781 A 12/1999 Nishikawa et al.
10,703,029 B2 7/2020 Yamamoto et al.
(Continued)

FOREIGN PATENT DOCUMENTS

CN 107073770 A 8/2017
CN 107848183 A 3/2018
(Continued)

OTHER PUBLICATIONS

Aug. 28, 2018 Search Report issued in International Patent Application No. PCT/JP2018/020294.
(Continued)

*Primary Examiner* — Alison L Hindenlang
*Assistant Examiner* — Virak Nguon
(74) *Attorney, Agent, or Firm* — Oliff PLC

(57) ABSTRACT

A method for producing a foam-molded product by using a plasticizing cylinder, includes: plasticizing and melting the thermoplastic resin to provide the molten resin in a plasticization zone of the plasticizing cylinder; introducing a pressurized fluid containing the physical foaming agent at a fixed pressure into a starvation zone of the plasticizing cylinder to retain the starvation zone at the fixed pressure; allowing the molten resin to be in the starved state in the starvation zone; bringing the molten resin in contact with the pressurized fluid containing the physical foaming agent at the fixed pressure, in the starvation zone in a state in which the starvation zone is retained at the fixed pressure; and molding the molten resin having been brought in contact
(Continued)

with the pressurized fluid containing the physical foaming agent into the foam-molded product.

15 Claims, 2 Drawing Sheets

Related U.S. Application Data continuation of application No. 16/716,664, filed on Dec. 17, 2019, now Pat. No. 11,260,564, which is a continuation of application No. PCT/JP2018/020294, filed on May 28, 2018.

(51) Int. Cl.
    *B29C 44/34* (2006.01)
    *B29K 81/00* (2006.01)

(56) References Cited

U.S. PATENT DOCUMENTS

| | | | |
|---|---|---|---|
| 11,260,564 B2 * | 3/2022 | Yusa | .................. B29C 44/0415 |
| 2002/0017734 A1 | 2/2002 | Sugihara et al. | |
| 2007/0182048 A1 | 8/2007 | Ogawa et al. | |
| 2010/0076137 A1 | 3/2010 | Ogasawara et al. | |
| 2010/0322548 A1 | 12/2010 | Kanbori et al. | |
| 2017/0225372 A1 | 8/2017 | Yamamoto et al. | |
| 2018/0117823 A1 | 5/2018 | Yusa et al. | |

FOREIGN PATENT DOCUMENTS

| | | | | |
|---|---|---|---|---|
| EP | 1166990 | A1 | 1/2002 | |
| EP | 3431246 | A1 | 1/2019 | |
| JP | 2625576 | B2 | 7/1997 | |
| JP | H11-034130 | A | 2/1999 | |
| JP | 2002-079545 | A | 3/2002 | |
| JP | 2003-191272 | A | 7/2003 | |
| JP | 3788750 | B2 | 6/2006 | |
| JP | 4144916 | B2 | 9/2008 | |
| JP | 2012-251022 | A | 12/2012 | |
| JP | 2013-060508 | A | 4/2013 | |
| JP | 2015-151471 | A | 8/2015 | |
| JP | 2016-087887 | A | 5/2016 | |
| JP | 2016087887 | A * | 5/2016 | ............ B29C 44/02 |
| JP | 2017-031441 | A | 2/2017 | |
| WO | 2007/122957 | A1 | 11/2007 | |

OTHER PUBLICATIONS

Aug. 28, 2018 Written Opinion issued in International Patent Application No. PCT/JP2018/020294.
Sep. 29, 2019 Office Action issued in Chinese Patent Application No. 201780005864.4.
Sep. 29, 2020 Office Action issued in Korean Patent Application No. 10-2019-7038265.
Feb. 2, 2021 Office Action issued in Japanese Patent Application No. 2017-124317.
Jan. 5, 2021 Office Action issued in Chinese Patent Application No. 201880034938.1.
Jun. 22, 2021 Decision of Refusal issued in Japanese Patent Application No. 2017-124317.
Mar. 30, 2021 European Extended Search Report issused in European Patent Application No. 18824421.4.
Apr. 23, 2021 Office Action issued in Korean Patent Application No. 10-2019-7038265.
Sep. 27, 2021 Office Action issued in Korean Patent Application No. 10-2021-7020282.

* cited by examiner ial No. 17/591,917 filed Feb. 3, 2022, which in turn is a continuation application of U.S. application Ser. No. 16/716,664 filed Dec. 17, 2019 (now U.S. Pat. No. 11,260,564), which in turn is a continuation application of International Application No. PCT/JP2018/020294 filed May 28, 2018 claiming convention priority of Japanese Patent Application No. 2017-124317 filed Jun. 26, 2017.

METHOD FOR MANUFACTURING FOAM MOLDED BODY AND FOAM MOLDED BODY

CROSS REFERENCE TO RERATED APPLICATION

This application is a continuation application of U.S. application Ser. No. 17/591,917 filed Feb. 3, 2022, which in turn is a continuation application of U.S. application Ser. No. 16/716,664 filed Dec. 17, 2019 (now U.S. Pat. No. 11,260,564), which in turn is a continuation application of International Application No. PCT/JP2018/020294 filed May 28, 2018 claiming convention priority of Japanese Patent Application No. 2017-124317 filed Jun. 26, 2017.

BACKGROUND OF THE INVENTION

Field of the Invention

The present invention relates to a method for producing a foam-molded product and the foam-molded product.

Description of the Related Art

In recent years, with a trend of weight reduction and electrification of automobiles, there is a movement of replacing metallic parts of the automobiles with foamed resin parts which are lightweight and insulating. Therefore, researches on and practical use of methods for producing foam-molded products (foaming molding) are carried out progressively. Conventionally, a general-purpose engineering plastic is used for the foaming molding, such as polypropylene (PP) and acrylonitrile butadiene styrene resin (ABS). Further, glass-fiber reinforced resins and the like of polyamide 6, polyamide 66 and the like, which have heat resistance to a certain degree, are also used for foaming molding. There are two types of foaming agents used for the foaming molding when classified broadly: the physical foaming agent and the chemical foaming agent. However, it is difficult to apply the chemical foaming agent to high-melting materials (high-melting-point materials). Therefore, in order for foam-molding the abovementioned glass-fiber reinforced resins and the like having high heat resistance, an injection foam molding method is adopted by using a supercritical fluid at a high pressure as the physical foaming agent (see, for example, Patent Literature 1: Japanese Patent No. 2,625,576, Patent Literature 2: Japanese Patent No. 3,788,750, and Patent Literature 3: Japanese Patent No. 4,144,916).

Because the regular heatproof temperature for abovementioned general-purpose engineering plastic is 100° C. or so, for the purpose of a presumed usage under the condition of a higher temperature, a super engineering whose regular heatproof temperature is 150° C. or higher is used, such as polyphenylene sulfide (PPS), liquid crystal polymer (LCP) or the like. PPS is a super engineering plastic being excelled in cost performance, and growing fastest in adoption for automobile parts. LCP is expanding its usage for small parts such as high-precision connectors. Patent Literature 4 (Japanese Patent Application Laid-open No. 2013-60508) and Patent Literature 5 (Japanese Patent Application Laid-open No. 2012-251022) disclose methods for producing foam-molded products of PPS.

The methods for producing the foam-molded product of PPS disclosed in Patent Literatures 4 and 5 are so called batch-type producing methods which have a step of maintaining the molded product of PPS in a pressurized inactive gas environment while permeating the same with an inactive gas, and a step of heating and foaming the PPS permeated with the inactive gas. Therefore, compared to continuous molding such as injection molding, extrusion molding and the like, there is a problem that the productivity is low.

The foam molding methods using a physical foaming agent disclosed in Patent Literatures 1 to 3 are a foaming molding technique of continuous modeling which has a high productivity and, comparatively, is not selective about resins. Therefore, in principle, it is conceivably possible to foam-mold the super engineering plastic of PPS or the like by the methods disclosed in Patent Literatures 1 to 3. In recent years, however, a very high heat resistance is required because foam-molded products are used as replacement parts for metallic parts. According to the studies of the present inventors, it is found out that a sufficient heat resistance is not obtainable in the foam-molded products using a conventional high-pressure physical foaming agent as disclosed in Patent Literatures 1 to 3 even though the super engineering plastic is used for the resin material.

The present teaching solves the problems described above. The present teaching provides a method for producing a foam-molded product of super engineering plastic having a high heat resistance, the method applying continuous molding with a high productivity.

SUMMARY OF THE INVENTION

According to a first aspect of the present teaching, there is provided a method for producing a foam-molded product by using a plasticizing cylinder which has a plasticization zone for plasticizing and melting a thermoplastic resin into a molten resin and a starvation zone for allowing the molten resin to be in a starved state, and which has an introducing port for introducing a physical foaming agent into the starvation zone, the method including:
plasticizing and melting the thermoplastic resin to provide the molten resin in the plasticization zone;
introducing a pressurized fluid containing the physical foaming agent at a fixed pressure into the starvation zone, thereby retaining the starvation zone at the fixed pressure;
allowing the molten resin to be in the starved state in the starvation zone;
bringing the molten resin in the starved state in contact with the pressurized fluid containing the physical foaming agent at the fixed pressure, in the starvation zone in a state in which the starvation zone is retained at the fixed pressure; and
molding the molten resin having been brought in contact with the pressurized fluid containing the physical foaming agent into the foam-molded product,
wherein the thermoplastic resin is a super engineering plastic, and the fixed pressure is from 0.5 MPa to 12 MPa.

According to the first aspect, the super engineering plastic may contain a polyphenylene sulfide or a liquid crystal polymer. Further, the super engineering plastic may contain a polyphenylene sulfide, and the fixed pressure is from 2 MPa to 12 MPa, or from 2 MPa to 10 MPa, or from 2 MPa to 8 MPa. Further, the super engineering plastic may contain a liquid crystal polymer, and the fixed pressure is from 1 MPa to 6 MPa. Further, the physical foaming agent may be nitrogen.

In the starvation zone, the molten resin may be pressurized by the pressurized fluid containing the physical foaming agent, and the starvation zone may be retained at the fixed pressure constantly during the production of the foam-molded product.

According to first aspect, the plasticizing cylinder may have an introducing speed adjusting container which is connected to the introducing port, the method may further include supplying the pressurized fluid containing the physical foaming agent into the introducing speed adjusting container, and the pressurized fluid containing the physical foaming agent at the fixed pressure may be introduced from the introducing speed adjusting container into the starvation zone. Further, the introducing port may be constantly open and the introducing speed adjusting container and the starvation zone may be retained at the fixed pressure during the production of the foam-molded product.

According to a second aspect of the present teaching, there is provided a foam-molded product including a super engineering plastic, wherein under a condition that the foam-molded product is heated to keep a surface temperature of the foam-molded product at 240° C. to 260° C. for 5 minutes, a change ratio of a thickness of the foam-molded product due to the heating is −2% to 2%.

According to the second aspect, the foam-molded product may be heated by a reflow furnace. The super engineering plastic may contain a polyphenylene sulfide or a liquid crystal polymer.

DESCRIPTION OF THE PREFERRED EMBODIMENTS

A method for producing (manufacturing) a foam-molded product (foam molded body, foamed molded product, foamed product, or molded foam) of a present embodiment is explained below while referring to a flowchart shown in FIG. 1.

<Apparatus for Producing Foam-Molded Product>

Figure 2:
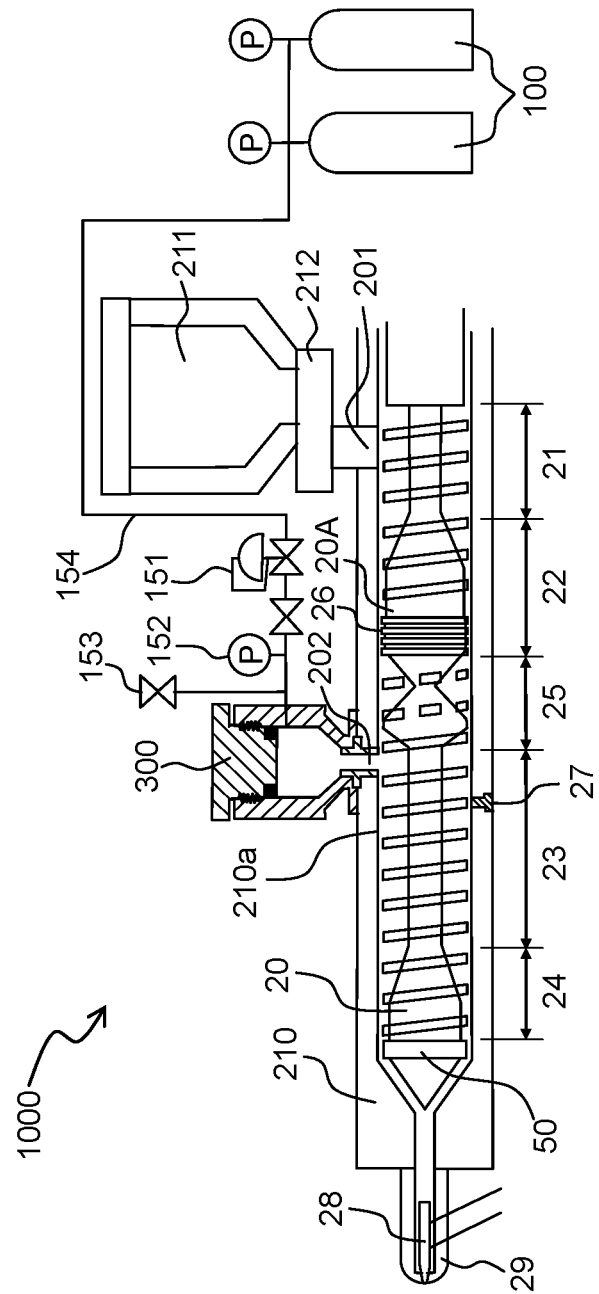
FIG. 2 schematically shows an apparatus for producing the foam-molded product used in the embodiment.

At first, an apparatus (a production apparatus) for producing the foam-molded product used in the present embodiment is explained. In the present embodiment, the foam-molded product is produced by using a production apparatus (injection molding apparatus) 1000 shown in FIG. 2. The production apparatus 1000 principally includes a plasticizing cylinder 210 which includes a screw 20 provided internally, a bomb or tank 100 which serves as a physical foaming agent supply mechanism for supplying a physical foaming agent to the plasticizing cylinder 210, a clamping unit (not shown) which is provided with a mold, and a control device or controller (not shown) which is provided to control the operations of the plasticizing cylinder 210 and the clamping unit. A molten resin, which is plasticized and melted in the plasticizing cylinder 210, flows from the right to the left as viewed in FIG. 2. Therefore, at the inside of the plasticizing cylinder 210 of the present embodiment, the right as viewed in FIG. 2 is defined as "upstream" or "backward", and the left is defined as "downstream" or "frontward".

The plasticizing cylinder has a plasticization zone 21 in which a thermoplastic resin is plasticized and melted into the molten resin, and a starvation zone 23 disposed on the downstream side of the plasticization zone 21, in which the molten resin is in the starved state. The "starved state" is a state in which the interior of the starvation zone 23 is not filled with the molten resin and the interior of the starvation zone 23 is unfilled. Therefore, the space other than the portion occupied by the molten resin exists in the starvation zone 23. Further, an introducing port 202, which is provided to introduce the physical foaming agent into the starvation zone 23, is formed. An introducing speed adjusting container 300 is connected to the introducing port 202. The bomb 100 supplies the physical foaming agent to the plasticizing cylinder 210 via the introducing speed adjusting container 300.

Note that the production apparatus 1000 has only one starvation zone 23. However, the production apparatus, which is usable for the present embodiment, is not limited thereto. For example, in order to facilitate the permeation of the physical foaming agent into the molten resin, it is also allowable to adopt such a structure that a plurality of starvation zones 23 and a plurality of introducing ports 202 formed therefor are provided, and the physical foaming agent is introduced into the plasticizing cylinder 210 from the plurality of introducing ports 202. Further, the production apparatus 1000 is the injection molding apparatus. However, the production apparatus, which is usable for the present embodiment, is not limited thereto. For example, it is also allowable to use an extrusion molding apparatus.

[Method for Producing a Foam-Molded Product]

(1) Plasticizing and Melting a Thermoplastic Resin

Figure 1:
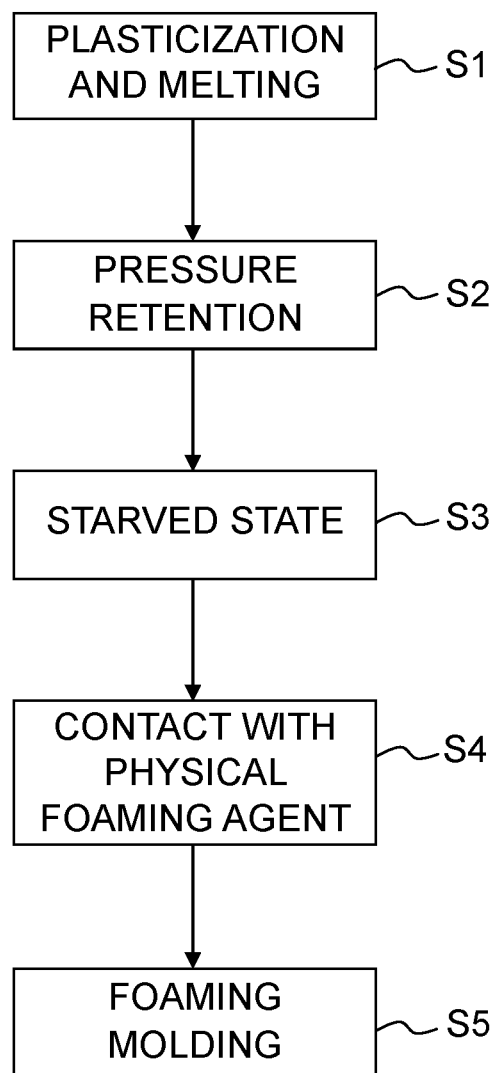
FIG. 1 shows a flowchart illustrating a method for producing a foam-molded product according to an embodiment.

At first, a thermoplastic resin is plasticized and melted to provide a molten resin in a plasticization zone 21 of a plasticizing cylinder 210 (Step S1 shown in FIG. 1). In the present embodiment, as for the thermoplastic resin, it is possible to use a super engineering plastic. Generally, because a plastic whose continuous working temperature is not lower than 150° C. is classified into the super engineering plastic, this specification also complies with this definition of super engineering plastic. Because many super engineering plastics include benzene rings in their molecular chains, the molecular chains are thick and strong. Because it is still difficult for the molecules to move even if the ambient temperature becomes high, a prominent heat resistance is brought on. Note that among fluorine resins, there are resins classified in the super engineering plastic which does not have a benzene-ring structure but still has a prominent heat resistance. This is because the fluorine resins are very stable when bound with carbon.

The super engineering plastic can be broadly divided into non-crystalline (transparent) resins and crystalline resins. Examples of the non-crystalline (transparent) resins are polyphenylsulfone (PPSU), polysulfone (PSU), polyarylate (PAR), and polyetherimide (PEI). Examples of the crystalline resins are polyetheretherketone (PEEK), polyphenylene sulfide (PPS), polyether sulfone (PES), polyamideimide (PAI), liquid crystal polymer (LCP), and polyvinylidene fluoride (PVDF). The super engineering plastic in the present embodiment may use a single one of the above chemicals or combine two types or more of them. Further, a polymer alloy containing those engineering plastics may also be used. It is preferable to use a crystalline resin being ready for forming minute cells as the super engineering plastic in the present embodiment, among which the polyphenylene sulfide (PPS) and the liquid crystal polymer (LCP) are more preferable.

The polyphenylene sulfide (PPS) has such advantages as being comparatively inexpensive, chemically stable, readily precise in size, high in strength, and the like. Therefore, the needs therefor are growing mainly on the market of automobile parts. On the other hand, PPS has such problems that burrs are likely to arise in molding, warpages are likely to occur if glass long fibers are mixed, and its specific gravity or density is high. In the present embodiment, by foam-molding PPS, it is possible to suppress the burrs and warpages and, furthermore, to lower the density. Because the liquid crystal polymer (LCP) is highly dependent on the shear rate of molten resin, there are such advantages that burrs are less likely to arise in molding, and high precision in size is available even to thin molded parts. For automobile parts, LCP is adopted in connectors requiring a high heat resistance. On the other hand, LCP has such problems as being expansive, and being high in density. In the present embodiment, by foam-molding LCP, it is possible to lower the density, and it is also possible to lower the cost because the amount of usage decreases in comparison to the same sized solid molded products (foamless-molded products).

The thermoplastic resin of the present embodiment may be kneaded with various inorganic fillers such as glass fibers, talc, carbon fibers, and the like. By mixing an inorganic filler which functions as a foaming nucleating agent and/or an additive which increases the melt tension, it is possible to obtain fine foam cells. The thermoplastic resin of the present embodiment may contain various general-purpose additives other than the above, if necessary.

Further, in the present embodiment, only the super engineering plastic is used as a thermoplastic resin. However, depending on the usage of the foam-molded product, any general-purpose thermoplastic resin, which is not a super engineering plastic, may be mixed thereinto as far as the heat resistance of the foam-molded product is not affected. In the present embodiment, the main ingredient of the thermoplastic resin composing the foam-molded product is super engineering plastic, that is, for example, the ratio of the super engineering plastic in the thermoplastic resin composing the foam-molded product is preferably 60% by weight to 100% by weight, and more preferably 95% by weight to 100% by weight. Further, in the present embodiment, the foaming agent uses physical foaming but does not combine any use of chemical foaming agent. Therefore, the super engineering plastic being a thermoplastic resin in the present embodiment does not contain any chemical foaming agent. Because the super engineering plastic has a high melt temperature, it is difficult to combine the use of a chemical foaming agent.

In the present embodiment, the thermoplastic resin is plasticized and melted in the plasticizing cylinder 210 including the screw 20 provided internally as shown in FIG. 2. A band heater (not shown) is arranged on an outer wall surface of the plasticizing cylinder 210, and the plasticizing cylinder 210 is heated thereby. Further, the shearing heat generated by the rotation of the screw 20 is also added, and thus the thermoplastic resin is plasticized and melted.

(2) Retaining Pressure in Starvation Zone

In the next place, the physical foaming agent having a fixed pressure (constant pressure or given pressure) is introduced into the starvation zone 23, and the starvation zone 23 is retained at the fixed pressure (Step S2 shown in FIG. 1).

The pressurized fluid is used as the physical foaming agent. In the present embodiment, the "fluid" means any one of liquid, gas, and supercritical fluid. Further, the physical foaming agent is preferably, for example, carbon dioxide or nitrogen in view of the cost and the load on the environment. In the present embodiment, the pressure of the physical foaming agent is relatively low. Therefore, for example, it is possible to use the fluid taken out from the bomb stored with the fluid including, for example, a nitrogen bomb, a carbon dioxide bomb, and an air bomb, while the pressure is reduced to provide the fixed pressure by a pressure reducing valve. In this case, it is unnecessary to use any pressure-raising apparatus. Therefore, it is possible to reduce the cost of the entire production apparatus. Further, the fluid, for which the pressure is raised to a predefined pressure, may be used as the physical foaming agent, if necessary. For example, when nitrogen is used as the physical foaming agent, the physical foaming agent can be produced by the following method. At first, the air of the atmospheric air is allowed to pass through a nitrogen separation membrane while compressing the air by a compressor so that nitrogen is purified. Subsequently, the pressure of purified nitrogen is raised to the predefined pressure by using, for example, a booster pump or a syringe pump, and thus the physical foaming agent is produced. Or, compressed air may be used as the physical foaming agent. In the present embodiment, the physical foaming agent and the molten resin are not forcibly sheared and kneaded. Thus, even when compressed air is used as the physical foaming agent, oxygen having a low solubility in the molten resin has difficulty dissolving in the molten resin. This can inhibit oxidation degradation in the molten resin.

The pressure of the physical foaming agent introduced into the starvation zone 23 is fixed or constant. The pressure of the starvation zone 23 is retained at the fixed pressure which is the same as that of the physical foaming agent to be introduced. The pressure of the physical foaming agent is, for example, 0.5 MPa to 12 MPa, preferably 2 MPa to 12 MPa, more preferably 2 MPa to 10 MPa, and much more preferably 2 MPa to 8 MPa. Or, the pressure of the physical foaming agent is preferably 1 MPa to 6 MPa. The optimum pressure differs depending on the type of the molten resin. However, when the pressure of the physical foaming agent is not less than 0.5 MPa, it is thereby possible to permeate, into the molten resin, the physical foaming agent in an amount required to cause the foaming. Thus, foaming performance of the foam-molded product is improved. When the pressure of the physical foaming agent is not more than 12 MPa, it is thereby possible to improve heat resistance of the foam-molded product, inhibit swirl marks, and further reduce the load on the apparatus. Note that the phrase that the pressure of the physical foaming agent for pressurizing the molten resin is "fixed" or "constant" means that the range of fluctuation of the pressure with respect to the predefined pressure is preferably within ±20% and more preferably within ±10%. The pressure of the starvation zone is measured, for example, by a pressure sensor 27 provided in the starvation zone 23 of the plasticizing cylinder 210. The starvation zone 23 moves back and forth in the plasticizing cylinder 210 together with back-and-forth movement of the screw 20. The pressure sensor 27 shown in FIG. 2 is positioned so that the pressure sensor 27 is in the starvation zone 23 at all times when the starvation zone 23 is in the frontmost position after the frontward movement as well as when the starvation zone 23 is in the backmost position after the backward movement. The position facing the introducing port 202 is also in the starvation zone 23 at all times. In that configuration, although the pressure sensor 27 is not provided at the position facing the introducing port 202, the pressure indicated by the pressure sensor 27 is substantially the same as the pressure at the position facing the introducing port 202. Further, in the present embodiment, only the physical foaming agent is introduced into the starvation zone 23. However, any other pressurized fluid than the physical foaming agent may be simultaneously introduced into the starvation zone 23 to such an extent that the effect of the present teaching is not affected thereby. In this case, the pressurized fluid including the physical foaming agent and introduced into the starvation zone 23 has the fixed pressure described above.

In the present embodiment, as shown in FIG. 2, the physical foaming agent is fed from the bomb 100, and the physical foaming agent is supplied from the introducing port 202 into the starvation zone 23 via the introducing speed adjusting container 300. The pressure of the physical foaming agent is reduced to the predefined pressure by using a pressure reducing valve 151, and then the physical foaming agent is introduced into the starvation zone 23 from the introducing port 202 without passing through, for example, a pressure raising apparatus. In the present embodiment, for example, the time of introduction and the amount of introduction of the physical foaming agent introduced into the plasticizing cylinder 210 are not controlled. Therefore, it is unnecessary to provide any mechanism for controlling them, for example, a driving valve based on the use of, for example, a check valve and/or a solenoid-operated valve. The introducing port 202 has no driving valve, and the introducing port 202 is always, constantly or normally open (open at all times). In the present embodiment, the area, which ranges from the pressure reducing valve 151 via the introducing speed adjusting container 300 to the starvation zone 23 in the plasticizing cylinder 210, is retained at the fixed pressure of the physical foaming agent by the physical foaming agent supplied from the bomb 100.

The introducing port 202 for the physical foaming agent has an inner diameter which is larger than that of an introducing port for the physical foaming agent of any conventional production apparatus. The reason why the inner diameter of the introducing port 202 can be large in this manner is that an amount of the molten resin at the position facing the introducing port 202 in the starvation zone 23 during the production of the foam-molded product is smaller than that of the conventional production apparatus. On this account, even in the case of the physical foaming agent having a relatively low pressure, the physical foaming agent can be efficiently introduced into the plasticizing cylinder 210. Further, even when a part of the molten resin is solidified by being brought in contact with the introducing port 202, the introducing port 202 can function as the introducing port without being completely clogged up, because the inner diameter is large. For example, when the inner diameter of the plasticizing cylinder 210 is large, namely, when an outer diameter of the plasticizing cylinder 210 is large, it is easy to make the inner diameter of the introducing port 202 large. On the other hand, if the inner diameter of the introducing port 202 is excessively large, the staying of the molten resin arises, which causes any defective molding. Further, the introducing speed adjusting container 300, which is connected to the introducing port 202, is large-sized, and the cost of the entire apparatus is increased. Specifically, the inner diameter of the introducing port 202 is preferably 20% to 100% of the inner diameter of the plasticizing cylinder 210 and more preferably 30% to 80% of the inner diameter of the plasticizing cylinder 210. Alternatively, the inner diameter of the introducing port 202 is preferably 3 mm to 150 mm and more preferably 5 mm to 100 mm, without depending on the inner diameter of the plasticizing cylinder 210. The inner diameter of the introducing port 202 means the inner diameter of an opening on an inner wall 210a of the plasticizing cylinder 210 as shown in FIG. 2. The shape of the introducing port 202, namely, the shape of the opening on the inner wall 210a of the plasticizing cylinder 210 is not limited to an exact circle, and it may be an ellipse or polygon. When the shape of the introducing port 202 is the ellipse or polygon, the diameter of the exact circle which has the same dimension (same area) as the introducing port 202 is defined as the "inner diameter of the introducing port 202".

In the next place, the introducing speed adjusting container 300 connected to the introducing port 202 is explained. The introducing speed adjusting container 300, which is connected to the introducing port 202, has a volume which is not less than a certain value. Accordingly, it is possible to obtain a slow or gentle flow rate of the physical foaming agent introduced into the plasticizing cylinder 210, and it is possible to secure the time for enabling the physical foaming agent to stay in the introducing speed adjusting container 300. The introducing speed adjusting container 300 is directly connected to the plasticizing cylinder 210, which is heated by the band heater (not shown) disposed therearound. This allows the heat of the plasticizing cylinder 210 to be transmitted to the introducing speed adjusting container 300. In that configuration, the physical foaming agent in the introducing speed adjusting container 300 is heated or warmed, the difference in temperature between the physical foaming agent and the molten resin is decreased, the great decrease in the temperature of the molten resin brought into contact with the physical foaming agent is inhibited, and it is thereby possible to stabilize the amount of dissolution (amount of permeation) of the physical foaming agent into the molten resin. That is, the introducing speed adjusting container 300 functions as a buffer container having a warming function for the physical foaming agent. On the other hand, if the volume of the introducing speed adjusting container 300 is excessively large, the cost of the entire apparatus is increased. Although depending on the amount of the molten resin existing in the starvation zone 23, the volume of the introducing speed adjusting container 300 is preferably 5 mL to 20 L, more preferably 10 mL to 2 L, and much more preferably 10 mL to 1 L. When the volume of the introducing speed adjusting container 300 is within this range, it is possible to secure the time for enabling the physical foaming agent to stay while taking the cost into consideration.

Further, as described later on, the physical foaming agent is brought in contact with the molten resin, and the physical foaming agent permeates thereinto. Thus, the physical foaming agent is consumed in the plasticizing cylinder 210. In order to retain the fixed pressure of the starvation zone 23, the physical foaming agent, which corresponds to the consumed amount, is introduced into the starvation zone 23 from the introducing speed adjusting container 300. If the volume of the introducing speed adjusting container 300 is excessively small, then the frequency of replacement of the physical foaming agent is raised, and hence the temperature of the physical foaming agent becomes unstable. As a result, it is feared that the supply of the physical foaming agent may become unstable. Therefore, it is preferable that the introducing speed adjusting container 300 has such a volume that the physical foaming agent, which corresponds to the amount consumed in the plasticizing cylinder for 1 minute to 10 minutes, can stay. Further, for example, the volume of the introducing speed adjusting container 300 is preferably 0.1 to 5 times as large as the volume of the starvation zone 23 connected to the introducing speed adjusting container 300, and more preferably 0.5 to 2 times as large as the volume of the starvation zone 23. In the present embodiment, the volume of the starvation zone 23 means a volume of a zone (23) in which a shaft of the screw 20 has a fixed diameter and depth of a screw flight is constant, in the plasticizing cylinder 210 which is empty and contains no molten resin. The introducing port 202 is always or normally open (open at all times), and thus the introducing speed adjusting container 300 and the starvation zone 23 is constantly retained at the fixed pressure of the physical foaming agent during the production of the foam-molded product.

(3) Allowing Molten Resin to be in Starved State

In the next place, the molten resin is allowed to flow to the starvation zone 23, and the molten resin is allowed to be in the starved state in the starvation zone 23 (Step S3 shown in FIG. 1). The starved state is determined by the balance between the feed amount of the molten resin fed from the upstream of the starvation zone 23 to the starvation zone 23 and the feed amount of the molten resin fed from the starvation zone 23 to the downstream thereof. If the former is smaller, the starved state is given.

In the present embodiment, a compression zone 22, in which the molten resin is compressed to raise the pressure, is arranged upstream of the starvation zone 23, thereby allowing the molten resin in the starvation zone 23 to be in the starved state. The compression zone 22 is provided with a large diameter portion 20A in which the diameter of the shaft of the screw 20 is larger (thicker) than that of the plasticization zone 21 positioned on the upstream side and the screw flight is shallowed in a stepwise manner. Further, a seal portion 26 is provided adjacently to the large diameter portion 20A on the downstream side from the large diameter portion 20A. Similar to the large diameter portion 20A, the diameter of the shaft of the screw 20 in the seal portion 26 is large (thick) and no screw flight is provided. Instead of the screw flight, the shaft of the screw 20 is formed having shallow grooves. When the diameter of the shaft of the screw 20 is large in each of the large diameter portion 20A and the seal portion 26, the clearance between the screw 20 and the inner wall of the plasticizing cylinder 210 is small, and it is possible to reduce the supply amount of the resin fed to the downstream. Therefore, it is possible to raise the flow resistance of the molten resin. Therefore, in the present embodiment, the large diameter portion 20A and the seal portion 26 are the mechanisms for raising the flow resistance of the molten resin. The seal portion 26 also works to inhibit the physical foaming agent from flowing back, namely, moving from the downstream side to the upstream side of the seal portion 26.

Owing to the presence of the large diameter portion 20A and the seal portion 26, the flow amount (flow rate) of the resin supplied from the compression zone 22 to the starvation zone 23 is lowered. The molten resin is compressed in the compression zone 22 disposed on the upstream side, and the pressure is raised. The starvation zone 23 disposed on the downstream side is unfilled with the molten resin (starved state). In order to facilitate the starved state of the molten resin, the screw 20 has the following structure. That is, the diameter of the shaft is small (thin) at the portion positioned in the starvation zone 23 and the screw flight is deep, as compared with the portion positioned in the compression zone 22. Further, it is preferable that the screw 20 has the following structure. That is, the diameter of the shaft is small (thin) and the screw flight is deep over the entire starvation zone 23, as compared with the portion positioned in the compression zone 22. Further, it is preferable that the diameter of the shaft of the screw 20 and the depth of the screw flight are substantially constant over the entire starvation zone 23. Accordingly, it is possible to retain the substantially fixed pressure in the starvation zone 23, and it is possible to stabilize the starved state of the molten resin. In the present embodiment, as shown in FIG. 2, the starvation zone 23 is formed at the portion of the screw 20, at which the diameter of the shaft of the screw 20 and the depth of the screw flight are constant.

The mechanism, which is provided in the compression zone 22 and which raises the flow resistance of the molten resin, is not specifically limited, provided that the mechanism temporarily reduces the flow passage area for allowing the molten resin to pass in order to restrict the flow amount (flow rate) of the resin supplied from the compression zone 22 to the starvation zone 23. In the present embodiment, both of the large diameter portion 20A of the screw and the seal portion 26 are used. However, only one of them may be used. Other than the large diameter portion 20A of the screw and the seal portion 26, the mechanism for raising the flow resistance is exemplified, for example, by a structure in which the screw flight is provided in an opposite direction as compared with other portions and a labyrinth structure which is provided on the screw.

The mechanism for raising the flow resistance of the molten resin may be provided for the screw, for example, as the ring which is the member distinct from the screw. Alternatively, the mechanism may be provided integrally with the screw as a part of the structure of the screw. When the mechanism for raising the flow resistance of the molten resin is provided, for example, as the ring which is the member distinct from the screw, the size of the clearance portion as the flow passage for the molten resin can be changed by changing the ring. Therefore, an advantage is obtained such that the magnitude of the flow resistance of the molten resin can be changed with ease.

Further, the molten resin can be also in the starved state in the starvation zone 23 by providing a counter flow preventing mechanism between the compression zone 22 and the starvation zone 23, other than the mechanism for raising the flow resistance of the molten resin. The counter flow preventing mechanism (seal mechanism) prevents the molten resin from the counter flow from the starvation zone 23 to the upstream compression zone 22. For example, it is possible to exemplify the seal mechanism including, for example, a steel ball or a ring which is movable to the upstream side in accordance with the pressure of the physical foaming agent. However, the counter flow preventing mechanism requires a driving portion, and hence it is feared that the resin may stay. On this account, it is preferable to use the mechanism for raising the flow resistance having no driving portion.

In the present embodiment, in order to stabilize the starved state of the molten resin in the starvation zone 23, it is also appropriate to control the supply amount of the thermoplastic resin supplied to the plasticizing cylinder 210, for the following reason. That is, if the supply amount of the thermoplastic resin is excessively large, it is difficult to maintain the starved state. In the present embodiment, the supply amount of the thermoplastic resin is controlled by using a general-purpose feeder screw 212. Limiting the supply amount of the thermoplastic resin makes the weighing speed of the molten resin in the starvation zone 23 higher than the plasticizing speed of the molten resin in the compression zone 22. This stably reduces the density of the molten resin in the starvation zone 23, thus facilitating permeation of the physical foaming agent into the molten resin.

In the present embodiment, it is preferable that the length of the starvation zone 23 in the flow direction of the molten resin is long in order to secure the contact area and the contact time between the molten resin and the physical foaming agent. However, if the length of the starvation zone 23 is excessively long, a harmful effect arises such that the molding cycle and the screw length are prolonged or lengthened. On this account, the length of the starvation zone 23 is preferably twice to twelve times the inner diameter of the plasticizing cylinder 210 and more preferably four times to ten times the inner diameter of the plasticizing cylinder 210. Further, it is preferable that the length of the starvation zone 23 covers the entire range of the weighing stroke in the injection molding. That is, it is preferable that the length of the starvation zone 23 in the flow direction of the molten resin is not less than the length of the weighing stroke in the injection molding. The screw 20 is moved frontwardly and backwardly in accordance with the plasticization, the weighing, and the injection of the molten resin. However, when the length of the starvation zone 23 is not less than the length of the weighing stroke, the introducing port 202 can be thereby arranged (formed) in the starvation zone 23 at all times during the production of the foam-molded product. In other words, even when the screw 20 is moved frontwardly and backwardly during the production of the foam-molded product, any zone other than the starvation zone 23 is not located at the position of the introducing port 202. Accordingly, the physical foaming agent, which is introduced from the introducing port 202, is constantly introduced into the starvation zone 23 during the production of the foam-molded product. As described above, when the starvation zone, which has the sufficient and appropriate size (length), is provided, and the physical foaming agent having the fixed pressure is introduced thereinto, then the starvation zone 23 can be thereby retained at the fixed pressure more easily. In the present embodiment, as shown in FIG. 2, the length of the starvation zone 23 is substantially the same as the length of the portion of the screw 20 where the diameter of the shaft of the screw 20 and the depth of the screw flight are constant.

A flowing speed adjusting zone 25 may be provided between the compression zone 22 and the starvation zone 23. Comparing the flowing speed of the molten resin in the compression zone 22 positioned upstream of the flowing speed adjusting zone 25 to the flowing speed of the molten resin in the starvation zone 23 positioned downstream of the flowing speed adjusting zone 25, the flowing speed of the molten resin in the starvation zone 23 is faster than that in the compression zone 22. The present inventors have found out that the foaming performance of the foam-molded product manufactured is improved by providing the flowing speed adjusting zone 25, which is a buffer zone, between the compression zone 22 and the starvation zone 23 and inhibiting the rapid change (increase) in the flowing speed of the molten resin. Although the reason why the foaming performance of the foam-molded product has improved is unclear, the following assumption can be made. Namely, providing the flowing speed adjusting zone 25, which is the buffer zone, between the compression zone 22 and the starvation zone 23 makes the molten resin stay in the flowing speed adjusting zone 25. This causes the molten resin and the physical foaming agent flowing from the starvation zone 23 to be kneaded forcibly, thereby lengthening the time of kneading. In the present embodiment, the molten resin and the physical foaming agent are decompressed and recompressed by providing a decompression portion and a compression portion in a part positioned in the flowing speed adjusting zone 25 of the screw 20 shown in FIG. 2 so as to change the area of flowing path. Further, the flowing speed of the molten resin is adjusted by providing a notch in the screw. It is possible to form the decompression portion and the compression portion by, for example, changing the depth of the screw flight, in other words, changing the size (thickness) of the diameter of the screw.

(4) Contact Between Molten Resin and Physical Foaming Agent

In the next place, the molten resin in the starved state and the physical foaming agent having the fixed pressure are brought in contact with each other in the starvation zone 23 in the state in which the starvation zone 23 is retained at the fixed pressure (Step S4 shown in FIG. 1). That is, the molten resin is pressurized at the fixed pressure by the physical foaming agent in the starvation zone 23. The starvation zone 23 is unfilled with the molten resin (starved state), and there is the space in which the physical foaming agent can exist. Therefore, the physical foaming agent and the molten resin can be efficiently brought in contact with each other. The physical foaming agent, which is brought in contact with the molten resin, permeates into the molten resin, and the physical foaming agent is consumed. When the physical foaming agent is consumed, the physical foaming agent, which stays in the introducing speed adjusting container 300, is supplied to the starvation zone 23. Accordingly, the pressure of the starvation zone 23 is retained at the fixed pressure, and the molten resin is continuously brought in contact with the physical foaming agent having the fixed pressure.

In the case of the conventional foam molding based on the use of the physical foaming agent, the physical foaming agent at a high pressure, which is in a predetermined amount, has been forcibly introduced into the plasticizing cylinder within a predetermined time. Therefore, it has been necessary that the pressure of the physical foaming agent should be raised to the high pressure, and the amount of introduction, the time of introduction into the molten resin and the like should be correctly controlled. The physical foaming agent is brought in contact with the molten resin for only the short time of introduction. On the contrary, in the present embodiment, the physical foaming agent is not forcibly introduced into the plasticizing cylinder 210. The physical foaming agent having the fixed pressure is continuously supplied into the plasticizing cylinder so that the pressure of the starvation zone 23 is fixed or constant, and the physical foaming agent is continuously brought in contact with the molten resin. Accordingly, the amount of dissolution (amount of permeation) of the physical foaming agent into the molten resin, which is determined by the temperature and the pressure, is stabilized. Further, the physical foaming agent of the present embodiment is constantly brought in contact with the molten resin. Therefore, the physical foaming agent, which is in the necessary and sufficient amount, can permeate into the molten resin. Accordingly, in the case of the foam-molded product produced in the present embodiment, the foam cells are fine, in spite of the use of the physical foaming agent having the low pressure as compared with any conventional molding method based on the use of the physical foaming agent.

Further, in the case of the production method of the present embodiment, it is unnecessary to control, for example, the amount of introduction and the time of introduction of the physical foaming agent. Therefore, it is unnecessary to provide any driving valve including, for example a check valve and a solenoid-operated valve as well as any control mechanism for controlling the same. It is possible to reduce the apparatus cost. Further, the physical foaming agent, which is used in the present embodiment, has the pressure lower than that of any conventional physical foaming agent. Therefore, the load on the apparatus is small as well.

In the present embodiment, the starvation zone 23 is constantly retained at the fixed pressure during the continuous production of the foam-molded product in injection molding cycle. In other words, in order to supplement the physical foaming agent consumed in the plasticizing cylinder, all of the steps of the method for producing the foam-molded product are carried out, while continuously supplying the physical foaming agent having the fixed pressure. Further, in the present embodiment, for example, when the injection molding is continuously performed for a plurality of shots, the molten resin, which corresponds to the next shot, is also prepared in the plasticizing cylinder during the period in which the injection step, the cooling step for the molded product, and the taking out step for the molded product are performed. The molten resin, which corresponds to the next shot, is pressurized at the fixed pressure by the physical foaming agent. In other words, in the case of the injection molding for the plurality of shots performed continuously, 1 cycle of the injection molding, which includes, for example, the plasticization and weighing step, the injection step, the cooling step for the molded product, and the taking out step, is performed in the state in which the molten resin and the physical foaming agent having the fixed pressure are constantly present and brought in contact with each other in the plasticizing cylinder, i.e., in the state in which the molten resin is constantly pressurized at the fixed pressure by the physical foaming agent in the plasticizing cylinder. Similarly, when the continuous molding such as the extrusion molding or the like is performed, the molding is also performed in the state in which the molten resin and the physical foaming agent having the fixed pressure are constantly present and brought in contact with each other in the plasticizing cylinder, i.e., in the state in which the molten resin is constantly pressurized at the fixed pressure by the physical foaming agent in the plasticizing cylinder.

(5) Foam Molding

In the next place, the molten resin, which has been brought in contact with the physical foaming agent, is molded into the foam-molded product (Step S5 shown in FIG. 1). The plasticizing cylinder 210 used in the present embodiment has a recompression zone 24 which is arranged adjacently to the starvation zone 23 downstream from the starvation zone 23 wherein the molten resin is compressed and the pressure is raised. At first, the molten resin in the starvation zone 23 is allowed to flow to the recompression zone 24 in accordance with the rotation of the plasticizing screw 20. The molten resin, which contains the physical foaming agent, is subjected to the pressure adjustment in the recompression zone 24, the molten resin is fed to the front of the plasticizing screw 20, and the molten resin is weighed. In this procedure, the molten resin, which is fed to the front of the plasticizing screw 20, has the internal pressure which is controlled as the screw back pressure by a hydraulic motor or an electric motor (not shown) connected to the back of the plasticizing screw 20. In the present embodiment, in order that the molten resin and the physical foaming agent are compatibly dissolved uniformly or homogeneously without separating the physical foaming agent from the molten resin and the resin density is stabilized, it is preferable that the internal pressure of the molten resin fed to the front of the plasticizing screw 20, i.e., the screw back pressure is controlled to be higher than the pressure of the starvation zone 23 retained to be fixed or constant, by about 1 to 6 MPa. Note that in the present embodiment, a check ring 50 is provided at the forward end of the screw 20 so that the compressed resin, which is disposed at the front of the screw 20, does not flow backward to the upstream side. Accordingly, the pressure of the starvation zone 23 is not affected by the resin pressure at the front of the screw 20 during the weighing.

The method for molding the foam-molded product is not specifically limited. For example, the molded product can be molded, for example, by the injection foam molding, the extrusion foam molding, or the foam blow molding. In the present embodiment, the injection foam molding is performed such that the weighed molten resin is injected and charged into a cavity (not shown) in a mold from the plasticizing cylinder 210 shown in FIG. 2. As for the injection foam molding, the short shot method may be used such that the molten resin, which is in a charge volume of 75% to 95% of the mold cavity volume, is charged into the mold cavity, and the mold cavity is subjected to the charging while expanding foams. Alternatively, the core back method may be used such that the molten resin, which is in a charge amount of 100% of the mold cavity volume, is charged, and then the cavity volume is expanded to cause the foaming. The obtained foam-molded product has foam cells at the inside. Therefore, the contraction or shrinking of the thermoplastic resin, which is caused during the cooling, is reduced to mitigate the sink mark and the warpage. It is possible to obtain the molded product having a low specific gravity. The shape of the foam-molded product is not specifically limited. The shape of the foam-molded product may be sheet-like shape or cylindrical shape molded by the extrusion foam molding and a complex shape molded by the injection foam molding.

In the production method of the present embodiment explained above, it is unnecessary to control, for example, the amount of introduction and the time of introduction of the physical foaming agent into the molten resin. Therefore, it is possible to omit or simplify the complicated control device, and it is possible to reduce the apparatus cost. Further, in the method for producing the foam-molded product of the present embodiment, the molten resin in the starved state and the physical foaming agent having the fixed pressure are brought in contact with each other in the starvation zone 23 in the state in which the starvation zone 23 is retained at the fixed pressure. Accordingly, the amount of dissolution (amount of permeation) of the physical foaming agent with respect to the molten resin can be stabilized by the simple mechanism.

By the method for producing a foam-molded product according to the present teaching, it is possible to produce a foam-molded product of super engineering plastic having a high heat resistance by way of continuous molding with a high productivity.

(6) About the Foam-Molded Product

The present inventors have found out that it is possible to produce a foam-molded product having a high heat resistance by the producing method of the present embodiment. With the super engineering plastic using the producing method of the present embodiment, the regular heatproof temperature is as high as 150° C. or above. Generally, however, the foam-molded product has a lower heat resistance in comparison with a solid molded product (foamless molded product). Therefore, a sufficient heat resistance is not attainable with the foam-molded product produced by using a conventional high-pressure physical foaming agent, even if the super engineering plastic is used as a thermoplastic resin. If the foam-molded product of a conventional super engineering plastic passes through a reflow furnace, for example, then such obstacles will arise that the foam cells expand to increase the thickness of the molded product, etc. Conversely, with respect to the foam-molded product obtained in the present embodiment, if the foam-molded product is heated to keep the surface temperature thereof at 240° C. to 260° C. for 5 minutes, for example, then the change ratio of the thickness of the foam-molded product due to the heating is −2% to 2%, or preferably −1% to 1%. Further, with respect to the foam-molded product obtained in the present embodiment, if the surface temperature of the foam-molded product is kept at 200° C. to 260° C. for 3 to 10 minutes, for example, then the change ratio of the thickness of the foam-molded product due to the heating is also −2% to 2%, or preferably −1% to 1%. The foam-molded product having such a high heat resistance has little change in shape even when passing through the reflow furnace for lead-free soldering, and is less likely to give rise to expansion and the like.

Here, the following formula defines the "change ratio of the thickness of the foam-molded product due to the heating":

$$(Da-db)/db \times 100(\%)$$

db: Thickness before heating the foam-molded product
Da: Thickness after heating the foam-molded product It is estimated that the high heat resistance of the foam-molded product of the present embodiment is brought on by using the super engineering plastic as the thermoplastic resin where the physical foaming agent is caused to contact with the molten resin in a starved state and rendered a specific range of a fixed pressure from 0.5 MPa to 12 MPa. Conventionally, for the foam molding by using a supercritical fluid or the like, the physical foaming agent is used at a high pressure from 15 to 20 MPa on average. The producing method of the present embodiment is different from that for the conventional foam molding in that the physical foaming agent at a fixed pressure which is comparatively low is caused to contact with the molten resin. The present inventors have found out that the heat resistance of the foam-molded product is improved by letting the fixed pressure of the physical foaming agent be not higher than 12 MPa, or more preferably be not higher than 8 MPa, or still more preferably be not higher than 6 MPa. Further, it is also possible to redress poor appearance (swirl mark) by lowering the fixed pressure of the physical foaming agent. The lower limit for the fixed pressure of the physical foaming agent is not lower than 0.5 MPa, or preferably not lower than 1 MPa, or more preferably not lower than 2 MPa, from the point of view of permeating the inside of the molten resin with a necessary amount of the physical foaming agent for the foaming.

Although it is not yet made clear why there is such a mechanism that the foam-molded product of the present embodiment has a high heat resistance, it is possible that some structural change arises in the foam-molded product of the present embodiment such as the foam cell walls being thickened, etc., and the structural change makes it different from the conventional foam-molded product, due to the combination of the thermoplastic resin (super engineering plastic) of a specific type, and the physical foaming agent at the fixed pressure over a specific range (0.5 MPa to 12 MPa). Further, it is estimated that the foaming agent remaining in the foam-molded product is expanded due to the heating to ill-affect the heat resistance of the foam-molded product. Therefore, it is conceivable for the foam-molded product of the present embodiment to have a high heat resistance simply because there is little foaming agent remaining in the foam-molded product. It is found out that the heat resistance can be improved by heating the remaining foaming agent at a low temperature over a long time to degas the same. However, it is not realistic that at least 24 hours or at least 48 hours are needed for the heating even under the heating condition of the temperature 100° C., for example.

The fixed pressure of the physical foaming agent of the present embodiment is 0.5 MPa to 12 MPa. However, depending on the type of the super engineering plastic, there is a more preferable range thereof. For example, if the super engineering plastic is polyphenylene sulfide (PPS), then the fixed pressure of the physical foaming agent is preferably 2 MPa to 12 MPa, or more preferably 2 MPa to 10 MPa, or still more preferably 2 MPa to 8 MPa. If the super engineering plastic is liquid crystal polymer (LCP), then the fixed pressure of the physical foaming agent is preferably 1 MPa to 6 MPa. With the above combination of the type of the super engineering plastic and the range of the fixed pressure of the physical foaming agent, it is possible to obtain a foam-molded product which is better in foaming performance and higher in heat resistance and, furthermore, it is also possible to restrain the swirl mark from happening.

For the foam-molded product produced according to the present embodiment, the average cell diameter of the foam cells contained therein is preferably not larger than 100 μm, or more preferably not larger than 50 μm. If the average cell diameter of the foam cells stays within the above range, then the lateral walls of the cells become small, thereby being less likely to expand when heated and, as a result, further improving the heat resistance of the foam-molded product. Note that it is possible to find the average cell diameter of the foam cells by way of, for example, image analysis of a cross-sectional SEM photograph of the foam-molded product.

For the foam-molded product produced according to the present embodiment, the thickness of foaming parts in which the foam cells are formed is preferably not smaller than 0.5, or more preferably not smaller than 1 mm, or still more preferably not smaller than 2 mm. With the thickness in the above range, it is possible to form a sufficiently thick skin layer on the molded product. With the skin layer, it is possible to restrain the foam cells from expansion when the foam-molded product is heated, such that the heat resistance of the foam-molded product is further improved. Especially, if LCP is used as the super engineering plastic, then the endohedral gas containing the physical foaming agent is less likely to escape from the foam-molded product of LCP. By increasing the thickness of the foaming parts, the foam cells are restrained from the expansion due to the expansion of the endohedral gas, such that the heat resistance of the foam-molded product using LCP is further improved. Further, for the foam-molded product produced according to the present embodiment, the thickness of the foaming parts in which the foam cells are formed may be not larger than 3 mm, or not larger than 2 mm, or not larger than 1 mm. The thinner the thickness of the foaming parts, the higher the change ratio is inclined to become in the thickness of the foam-molded product due to the heating. However, because the foam-molded product produced according to the present embodiment has a high heat resistance, with the foaming parts being as thick as in the above range, it is possible to restrain the change ratio of the foam-molded product at −2% to 2%, or more preferably −1% to 1%.

In the present embodiment, the produced foam-molded product may further undergo an annealing step. By heating the foam-molded product through the annealing step, it is possible to expel the endohedral gas containing the physical foaming agent from the foam-molded product. By virtue of this, the foam cells are restrained from the expansion due to the expansion of the endohedral gas, such that the heat resistance of the foam-molded product is further improved.

EXAMPLES

Hereinbelow, practical examples and comparative examples will be used for further explanations on the present teaching. However, the present teaching is not limited to the following practical examples and comparative examples.

Production of Example 1-1

A sample 1-1 (foam-molded product) was produced by using polyphenylene sulfide (PPS) (DURAFIDE 1130T6, manufactured by Polyplastics Co., Ltd.) as a thermoplastic resin, and nitrogen as a physical foaming agent. The pressure of the physical foaming agent introduced into the starvation zone of the plasticizing cylinder was 1 MPa.

(1) Production Apparatus

In Example 1, the production apparatus 1000 shown in FIG. 2 used in the embodiment described above was used. Details of the production apparatus 1000 will be explained. As described above, the production apparatus 1000 is the injection molding apparatus including the plasticizing cylinder 210, the bomb 100 which serves as the physical foaming agent supply mechanism for supplying the physical foaming agent to the plasticizing cylinder 210, the clamping unit (not shown) which is provided with the mold, and the control device (not shown) which is provided to control the operations of the plasticizing cylinder 210 and the clamping unit.

A shutoff valve 28, which is opened/closed in accordance with the driving of an air cylinder, is provided at a nozzle forward end 29 of the plasticizing cylinder 210. The interior of the plasticizing cylinder 210 can be retained at a high pressure. The mold (not shown) is brought in tight contact with the nozzle forward end 29. The molten resin is injected and charged from the nozzle forward end 29 into the cavity formed by the mold. A resin supply port 201 for supplying the thermoplastic resin to the plasticizing cylinder 210 and the introducing port 202 for introducing the physical foaming agent into the plasticizing cylinder 210 are formed in this order as referred to from the upstream side on the upper side surface of the plasticizing cylinder 210. A resin supplying hopper 211 and the feeder screw 212; and the introducing speed adjusting container 300 are arranged for the resin supply port 201 and the introducing port 202 respectively. The bomb 100 is connected to the introducing speed adjusting container 300 by the piping 154 via a pressure reducing valve 151, a pressure gauge 152, and an open valve 153. Further, a sensor 27 for monitoring the pressure in the starvation zone 23 is provided in the starvation zone 23 of the plasticizing cylinder 210.

The screw 20 is arranged rotatably and movably back and forth in the plasticizing cylinder 210 in order to facilitate the plasticization and the melting of the thermoplastic resin and perform the weighing and the injection of the molten resin. As described above, the screw 20 is provided with the seal portion 26 and the large diameter portion 20A of the screw 20 as the mechanisms for raising the flow resistance of the molten resin.

As for the plasticizing cylinder 210, the thermoplastic resin is supplied from the resin supply port 201 into the plasticizing cylinder 210. The thermoplastic resin is plasticized by the band heater (not shown) to provide the molten resin which is fed to the downstream in accordance with the forward rotation of the screw 20. Owing to the presence of the seal portion 26 and the large diameter portion 20A provided for the screw 20, the molten resin is compressed to raise the pressure on the upstream side of the seal portion 26, and the starvation zone 23 positioned downstream of the seal portion 26 is unfilled with the molten resin (starved state). The molten resin, which is further fed to the downstream, is recompressed and weighed in the vicinity of the forward end of the plasticizing cylinder 210 before the injection.

Accordingly, the plasticization zone 21 in which the thermoplastic resin is plasticized and melted, the compression zone 22 in which the molten resin is compressed to raise the pressure, the flowing speed adjusting zone 25 in which the flowing speed of the molten resin is adjusted, the starvation zone 23 which is unfilled with the molten resin, and the recompression zone 24 in which the molten resin subjected to the pressure reduction in the starvation zone is compressed again are formed in this order as referred to from the upstream side in the plasticizing cylinder 210.

In the production apparatus 1000, the inner diameter of the plasticizing cylinder 210 was 22 mm, and the inner diameter of the introducing port 202 was 6 mm. Therefore, the inner diameter of the introducing port 202 was about 27% of the inner diameter of the plasticizing cylinder 210. The volume of the introducing speed adjusting container 300 was about 80 mL. Further, the volume of the starvation zone 23 was 110 mL. Therefore, the volume of the introducing speed adjusting container 300 was approximately 0.7 times the volume of the starvation zone 23. Further, in Example 1, the mold, in which the size of the cavity was 5 cm×5 cm×2 mm, was used.

(2) Production of Foam-Molded Product

In Example 1, a nitrogen bomb having a volume of 47 L, which was charged with nitrogen at 14.5 MPa, was used as the bomb 100. At first, the value of the pressure reducing valve 151 was set to 1 MPa. The bomb 100 was opened to supply nitrogen at 1 MPa, via the pressure reducing valve 151, the pressure gauge 152, and the introducing speed adjusting container 300, from the introducing port 202 of the plasticizing cylinder 210 into the starvation zone 23. During the production of the molded product, the bomb 100 was open at all times.

In the plasticizing cylinder 210, the band heater (not shown) was used to adjust the plasticization zone 21 from 300 to 320° C., the compression zone 22 at 320° C., the starvation zone 23 and the flowing speed adjusting zone 25 at 300° C., and the recompression zone 24 at 320° C. Then, resin pellets of the thermoplastic resin (PPS) were supplied from the resin supplying hopper 211 into the plasticizing cylinder 210 while rotating the feeder screw 212 at a number of revolutions of 30 rpm, and the screw 20 was forwardly rotated. Accordingly, the thermoplastic resin was heated and kneaded to provide the molten resin in the plasticization zone 21.

The number of revolutions of the feeder screw 212 was determined as a number of revolutions at which the resin pellets were supplied in the starved state by setting the molding conditions for Example 1 through molding of a solid molded product (unfoam-molded product) in advance. Here, the wording "the resin pellets were supplied in the starved state" means the state as follows. The state in which the plasticizing cylinder is unfilled with the resin pellets or the molten resin is maintained during the supply of the resin pellets into the plasticization zone 21, and the screw flight of the screw 20 is exposed from the supplied resin pellets or the molten resin. Whether the resin pellets are supplied in the starved state is checked, for example, by a method in which the presence or absence of the resin pellet or molten resin on the screw 20 is checked by using an infrared sensor or visualization camera. The feeder screw 212 used in Example 1 was provided with a transparent window, which allowed a user to visually check the state of the plasticization zone 21 positioned immediately below the resin supply port 201 via the transparent window.

The screw 20 was forwardly rotated at a back pressure of 3 MPa (1 MPa (pressure of the physical foaming agent)+2 MPa=3 MPa) and a number of revolutions of 100 rpm, and the molten resin was thereby allowed to flow from the plasticization zone 21 to the compression zone 22. Further, the molten resin was allowed to flow to the flowing speed adjusting zone 25 and the starvation zone 23.

The molten resin flowed to the flowing speed adjusting zone 25 and the starvation zone 23 through the gap between the inner wall of the plasticizing cylinder 210 and the large diameter portion 20A and the gap between the inner wall of the plasticizing cylinder 210 and the seal portion 26. Therefore, the supply amount of the molten resin supplied to the starvation zone 23 was restricted. Accordingly, the molten resin was compressed to raise the pressure in the compression zone 22, and the starvation zone 23 disposed on the downstream side was unfilled with the molten resin (starved state). The starvation zone 23 was unfilled with the molten resin (starved state), and hence the physical foaming agent (nitrogen) introduced from the introducing port 202 was present in the space in which the molten resin was absent. The molten resin was pressurized by the physical foaming agent.

Further, the molten resin was fed to the recompression zone 24, and the molten resin was recompressed. The molten resin in an amount of one shot was weighed at the forward end portion of the plasticizing cylinder 210 while backing or retracting the screw 20. After that, the shutoff valve 28 was opened to inject and charge the molten resin so that the charge ratio was 90% of the volume of the cavity and thus the foam-molded product having a flat plate shape was molded (short shot method). Temperature of the mold was 150° C. After the molding, the foam-molded product was taken out from the interior of the mold after waiting for the cooling of the foam-molded product. The cooling time was 10 seconds.

Twenty foam-molded products were obtained by continuously carrying out 20 shots of injection molding for the molded products explained above. During the production of the 20 foam-molded products, the pressure was constantly measured with the pressure sensor 27 for the starvation zone 23 in the plasticizing cylinder 210. As a result, the pressure of the starvation zone 23 was constantly fixed at 1 MPa. Further, the value on the pressure gauge 152 indicating the pressure of the nitrogen supplied to the starvation zone 23 was also constantly fixed at 1 MPa during the production of the foam-molded products. From the above fact, it was confirmed that through one cycle of the injection molding which includes the plasticizing measurement step, injection step, cooling step for the molded product, take-out step and the like, in the starvation zone 23 the molten resin was constantly pressurized with the nitrogen at 1 MPa, and in the starvation zone 23 the molten resin was constantly pressurized with the nitrogen during the period of continuous molding for the 20 molded products.

Production of Samples 1-2 to 1-10

Samples 1-2 to 1-10 (foam-molded products) were produced by the same method as for the sample 1-1 except that the pressures of the physical foaming agent introduced into the starvation zone of the plasticizing cylinder were, respectively, 2 MPa, 4 MPa, 6 MPa, 8 MPa, 10 MPa, 12 MPa, 14 MPa, 18 MPa, and 0.4 MPa.

During the production of each sample (foam-molded products), the pressure was constantly measured with the pressure sensor 27 for the starvation zone 23 in the plasticizing cylinder 210. As a result, the starvation zone 23 was constantly fixed at the same pressure as the introduced physical foaming agent. Further, the value on the pressure gauge 152 indicating the pressure of the nitrogen supplied to the starvation zone 23 was also constantly fixed at the pressure set for each sample, during the production of the foam-molded products. From the above fact, it was confirmed that through one cycle of the injection molding which includes the plasticizing measurement step, injection step, cooling step for the molded product, take-out step and the like, in the starvation zone 23 the molten resin was constantly pressurized with the nitrogen at the fixed pressure set for each sample, and in the starvation zone 23 the molten resin was constantly pressurized with the nitrogen during the period of continuous molding for the 20 molded products.

[Evaluation of the Samples 1-1 to 1-10]

Evaluation was made on the samples 1-1 to 1-10 (foam-molded products) by the method explained below. Table 1 and Table 2 show the result of evaluating each sample along with the pressure of the physical foaming agent used in producing the sample. Note that the samples 1-1 to 1-7 correspond to the practical example where the pressure of the physical foaming agent is 1 to 12 MPa used in the production, while the samples 1-8 to 1-10 correspond to the comparative example where the pressure of the physical foaming agent is 14 MPa, 18 MPa and 0.4 MPa.

(1) Foaming Performance of the Foam-Molded Product

Observations were made on the shape and cross section of the foam-molded product to evaluate the foaming performance of the foam-molded product according to the following evaluation criteria. Note that the foam-molded product, which was evaluated at class A according to the following evaluation criteria, decreased in density about 10%, compared to the solid molded product.

<Evaluation Criteria for Foaming Performance>

A: Sufficiently Foaming

The foam-molded product completely fills the cavity of the mold such that the foam cells formed inside the foam-molded product are miniaturized (the cell diameter is about 30 to 50 μm).

B. Foaming

Although the foam-molded product does not completely fill the cavity of the mold, there are no unfilled parts in end portions of the cavity. That is, the flow terminals of the molten resin reach the end portions of the cavity. There are observed here and there bloated foam cells formed inside the foam-molded product (the cell diameter is about 100 to 200 μm).

C. Only Parts of the Molded Product are Foaming

There are unfilled parts in the end portions of the cavity of the mold. That is, the flow terminals of the molten resin do not reach the end portions of the cavity. Bloated foam cells (the cell diameter is about 100 to 200 μm) are formed in the vicinity of the end portions of the foam-molded product (in the vicinity of flow terminals of the molten resin).

(2) Change Ratio of the Thickness of the Foam-Molded Product in a Heating Test

From the 20 foam-molded products of each of the samples 1-1 to 1-10 prepared above, 5 foam-molded products were selected randomly. First, for each one foam-molded product, four places were measured in terms of the length of the part (thickness db) corresponding to the thickness of the flat plate (the part corresponding to the width of 2 mm of the cavity of the mold). Then, a heating test was performed as will be explained below. First, the foam-molded product was still placed in a electric furnace being heated to a set temperature of 250° C., supposing that the electric furnace was a reflow furnace for lead-free soldering. The surface of the foam-molded product was put in contact with a thermocouple, and the surface temperature was measured. It was confirmed that the highest reachable temperature was 240° C. to 260° C. Five minutes after the surface temperature reached the highest temperature, the foam-molded product was taken out from the electric furnace. The foam-molded product had been placed still in the electric furnace for about 8 to 9 minutes. After the foam-molded product was cooled down to the room temperature, the thickness of the parts whose thickness had been measured before the heating was measured again (the thickness Da), so as to find the change ratio of the thickness of the foam-molded product due to the heating test with the following formula:

$$(Da-db)/db \times 100(\%)$$

db: Thickness before heating the foam-molded product

Da: Thickness after heating the foam-molded product

For one foam-molded product, the change ratios of the thicknesses of four places were found. Further, for five foam-molded products of each sample, the change ratios of the thicknesses were found in the same manner (four places×5 products=20 places in total). Then, an average value of the change ratios of the thicknesses of those 20 places was taken as the change ratio of the thicknesses of the foam-molded products of each sample in the heating test.

(3) Surface Swollenness after the Heating Test

After the abovementioned heating test, the surfaces of the foam-molded products were observed to evaluate where or not there was swollenness on the surfaces according to the following evaluation criteria.

<Evaluation Criteria for Surface Swollenness after the Heating Test>

A. No swollenness on the surface of the foam-molded product,

B. Small swollenness on part of the surface of the foam-molded product (smaller than 1 mm in diameter), C. Large swollenness on the surface of the foam-molded product (1 mm to 3 mm in diameter), and D. Larger swollenness on the surface of the foam-molded product (not smaller than 3 mm in diameter)

(4) Swirl Mark on the Surface of the Foam-Molded Product

Before the heating test, the surfaces of the foam-molded products were observed to evaluate where or not there was swirl mark on the surfaces according to the following evaluation criteria.

<Evaluation Criteria for Swirl Mark>

A: No occurrence of swirl mark, or only very little occurrence

B. Swirl mark is occurring on part of the surface of the foam-molded product

C. Swirl mark is occurring on the entire surface of the foam-molded product, such that the surface of the foam-molded product is whitely opaque.

TABLE 1

| Sample No. | 1-10 | 1-1 | 1-2 | 1-3 | 1-4 |
|---|---|---|---|---|---|
| Physical foaming agent pressure (MPa) | 0.4 | 1 | 2 | 4 | 6 |
| (1) Foaming performance | C | B | A | A | A |
| (2) Change ratio of thickness (%) | −0.4 | −0.3 | −0.3 | −0.4 | −0.3 |
| (3) Surface swollenness | A | A | A | A | A |
| (4) Swirl mark | A | A | A | A | A |

TABLE 2

| Sample No. | 1-5 | 1-6 | 1-7 | 1-8 | 1-9 |
|---|---|---|---|---|---|
| Physical foaming agent pressure (MPa) | 8 | 10 | 12 | 14 | 18 |
| (1) Foaming performance | A | A | A | A | A |
| (2) Change ratio of thickness (%) | −0.2 | 0.2 | 0.8 | 1.3 | 3 |
| (3) Surface swollenness | A | A | A | C | D |
| (4) Swirl mark | A | A | B | C | C |

It was confirmed that with the samples 1-1 to 1-7 where the pressure of the physical foaming agent used in the production was 1 to 12 MPa, the heating resistance was high because the foaming performance was good, the change ratio of the thickness of the foam-molded product in the heating test was small, and the swollenness on the surface was small, too. Further, the swirl mark was also restrained from occurring. Further, with the samples 1-2 to 1-6 where the pressure of the physical foaming agent used in the production was 2 to 10 MPa, the foaming performance was better, the heating resistance was higher, and there was less occurrence of swirl mark, too.

On the other hand, it was understood that with the samples 1-8 and 1-9 where the pressure of the physical foaming agent used in the production exceeded 12 MPa, the heating resistance was low because the change ratio of the thickness of the foam-molded product in the heating test was large, and the swollenness on the surface was large, too. Further, the occurrence of swirl mark was also distinct with the samples 1-8 and 1-9. Further, insufficient foaming performance was found with the sample 1-10 where the pressure of the physical foaming agent used in the production was lower than 0.5 MPa.

Production of Examples 2-1 to 2-8

Samples 2-1 to 2-8 (foam-molded products) were produced by the same method as for the sample 1-1 except that liquid crystal polymer (LCP) (LAPEROS S135, manufactured by Polyplastics Co., Ltd.) was used as a thermoplastic resin, and the pressures of the physical foaming agent (nitrogen) introduced into the starvation zone of the plasticizing cylinder were, respectively, 0.5 MPa, 1 MPa, 2 MPa, 4 MPa, 6 MPa, 8 MPa, 10 MPa, and 0.4 MPa.

During the production of each sample (foam-molded products), the pressure was constantly measured with the pressure sensor 27 for the starvation zone 23 in the plasticizing cylinder 210. As a result, the starvation zone 23 was constantly fixed at the same pressure as the introduced physical foaming agent. Further, the value on the pressure gauge 152 indicating the pressure of the nitrogen supplied to the starvation zone 23 was also constantly fixed at the pressure set for each sample, during the production of the foam-molded products. From the above fact, it was confirmed that through one cycle of the injection molding which includes the plasticizing measurement step, injection step, cooling step for the molded product, take-out step and the like, in the starvation zone 23 the molten resin was constantly pressurized with the nitrogen at the fixed pressure set for each sample, and in the starvation zone 23 the molten resin was constantly pressurized with the nitrogen during the period of continuous molding for the 20 molded products.

For the samples 2-1 to 2-8 (foam molded products) prepared above, the following evaluations (1) to (4) were made by the same method for the aforementioned samples 1-1 to 1-10:
(1) Foaming performance of the foam-molded product,
(2) Change ratio of the thickness of the foam-molded product in the heating test,
(3) Surface swollenness after the heating test, and
(4) Swirl mark on the surface of the foam-molded product Table 3 shows the result of evaluating each sample along with the pressure of the physical foaming agent used in producing the sample. Note that the samples 2-1 to 2-7 correspond to the practical example where the pressure of the physical foaming agent is 0.5 to 10 MPa used in the production, while the sample 2-8 corresponds to the comparative example where the pressure of the physical foaming agent is 0.4 MPa.

TABLE 3

| Sample No. | 2-8 | 2-1 | 2-2 | 2-3 | 2-4 | 2-5 | 2-6 | 2-7 |
|---|---|---|---|---|---|---|---|---|
| Physical foaming agent pressure (MPa) | 0.4 | 0.5 | 1 | 2 | 4 | 6 | 8 | 10 |
| (1) Foaming performance | C | B | A | A | A | A | A | A |
| (2) Change ratio of thickness (%) | −0.3 | −0.3 | −0.3 | −0.2 | 0.2 | 0.7 | 1.5 | 2 |
| (3) Surface swollenness | A | A | A | A | A | A | B | C |
| (4) Swirl mark | A | A | A | A | A | A | B | B |

It was confirmed that with the samples 2-1 to 2-7 where the pressure of the physical foaming agent used in the production was 0.5 to 10 MPa, the heating resistance was high because the foaming performance was good, and the change ratio of the thickness of the foam-molded product in the heating test was small. Further, the swirl mark was also restrained from occurring. Further, with the samples 2-2 to 2-5 where the pressure of the physical foaming agent used in the production was 1 to 6 MPa, the foaming performance was better, the heating resistance was higher, and there was little occurrence of swirl mark, too.

On the other hand, insufficient foaming performance was found with the sample 2-8 where the pressure of the physical foaming agent used in the production was 0.4 MPa.

According to the production method of the present teaching, it is possible to simplify the apparatus mechanism concerning the physical foaming agent. Further, the foam-molded product, which has a prominent foaming performance, can be efficiently produced at a low cost. Further, it is possible to produce the foam-molded product of super engineering plastic having a high heat resistance.

What is claimed is:

1. A method for producing a foam-molded product by using a plasticizing cylinder which has a plasticization zone for plasticizing and melting a thermoplastic resin into a molten resin and a starvation zone for allowing the molten resin to be in a starved state, and which has an introducing port for introducing a physical foaming agent into the starvation zone,
the method comprising:
plasticizing and melting the thermoplastic resin to provide the molten resin in the plasticization zone;
introducing a pressurized fluid containing the physical foaming agent at a fixed pressure into the starvation zone, thereby retaining the starvation zone at the fixed pressure;
allowing the molten resin to be in the starved state in the starvation zone;
bringing the molten resin in the starved state in contact with the pressurized fluid containing the physical foaming agent at the fixed pressure, in the starvation zone in a state in which the starvation zone is retained at the fixed pressure; and
molding the molten resin having been brought in contact with the pressurized fluid containing the physical foaming agent into the foam-molded product,
wherein the thermoplastic resin contains 60% by weight or more of a super engineering plastic, and the fixed pressure is from 0.5 MPa to 6 MPa, and
wherein the thermoplastic resin does not contain a chemical forming agent.

2. The method according to claim 1, wherein the super engineering plastic contains a polyphenylene sulfide or a liquid crystal polymer.

3. The method according to claim 1, wherein the super engineering plastic contains a liquid crystal polymer, and the fixed pressure is from 1 MPa to 6 MPa.

4. The method according to claim 1, wherein the physical foaming agent is nitrogen.

5. The method according to claim 1, wherein in the starvation zone, the molten resin is pressurized by the pressurized fluid containing the physical foaming agent.

6. The method according to claim 1, wherein the starvation zone is retained at the fixed pressure constantly during the production of the foam-molded product.

7. The method according to claim 1, wherein the plasticizing cylinder has an introducing speed adjusting container which is connected to the introducing port,
the method further comprising:
supplying the pressurized fluid containing the physical foaming agent into the introducing speed adjusting container, wherein the pressurized fluid containing the physical foaming agent at the fixed pressure is introduced from the introducing speed adjusting container into the starvation zone.

8. The method according to claim 7, wherein the introducing port is constantly open and the introducing speed adjusting container and the starvation zone are retained at the fixed pressure during the production of the foam-molded product.

9. The method according to claim 1, wherein an average cell diameter of foam cells contained in the foam-molded product is not larger than 100 μm.

10. A foam-molded product comprising a thermoplastic resin containing 60% by weight or more of a super engineering plastic,
wherein under a condition that the foam-molded product is heated to keep a surface temperature of the foam-molded product at 240° C. to 260° C. for 5 minutes, a change ratio of a thickness of the foam-molded product due to the heating is −2% to 2%, and
wherein the thermoplastic resin does not contain a chemical forming agent.

11. The foam-molded product according to claim 10, wherein the foam-molded product is heated by a reflow furnace.

12. The foam-molded product according to claim 10, wherein the super engineering plastic contains a polyphenylene sulfide or a liquid crystal polymer.

13. The foam-molded product according to claim 10, wherein an average cell diameter of foam cells contained in the foam-molded product is not larger than 100 μm.

14. A method for producing a foam-molded product by using a plasticizing cylinder which has a plasticization zone for plasticizing and melting a thermoplastic resin into a molten resin and a starvation zone for allowing the molten resin to be in a starved state, and which has an introducing port for introducing a physical foaming agent into the starvation zone, the method comprising:
  plasticizing and melting the thermoplastic resin to provide the molten resin in the plasticization zone;
  introducing a pressurized fluid containing the physical foaming agent at a fixed pressure into the starvation zone, thereby retaining the starvation zone at the fixed pressure;
  allowing the molten resin to be in the starved state in the starvation zone;
  bringing the molten resin in the starved state in contact with the pressurized fluid containing the physical foaming agent at the fixed pressure, in the starvation zone in a state in which the starvation zone is retained at the fixed pressure; and
  molding the molten resin having been brought in contact with the pressurized fluid containing the physical foaming agent into the foam-molded product,
wherein the thermoplastic resin is a super engineering plastic, and
  either the super engineering plastic contains a polyphenylene sulfide and the fixed pressure is from 2 MPa to 10 MPa, or
  the super engineering plastic contains a liquid crystal polymer and the fixed pressure is from 1 MPa to 6 MPa, and
wherein the thermoplastic resin does not contain a chemical forming agent.

15. The method according to claim 14, wherein an average cell diameter of foam cells contained in the foam-molded product is not larger than 100 μm.

\* \* \* \* \*